United States Patent [19]

Ohashi

[11] Patent Number: 5,465,159
[45] Date of Patent: Nov. 7, 1995

[54] IMAGE SIGNAL RECORDING APPARATUS CAPABLE OF RECORDING FIELD IMAGE SIGNALS, FRAME IMAGE SIGNALS AND HIGH DEFINITION IMAGE SIGNALS

[75] Inventor: Kazuhito Ohashi, Kanagawa, Japan

[73] Assignee: Canon Kabushiki Kaisha, Tokyo, Japan

[21] Appl. No.: 303,147

[22] Filed: Sep. 8, 1994

Related U.S. Application Data

[63] Continuation of Ser. No. 507,320, Apr. 9, 1990, abandoned.

[30] Foreign Application Priority Data

Apr. 24, 1989 [JP] Japan ................................... 1-104214

[51] Int. Cl.$^6$ ................................................. H04N 5/781
[52] U.S. Cl. ........................... 358/342; 358/335; 360/18; 360/22; 360/27; 360/35.1
[58] Field of Search ............................... 358/335, 320, 358/906, 323, 337, 342, 343; 360/9.1, 18, 20, 22, 23, 27, 35.1; H04N 5/76, 9/79, 5/781

[56] References Cited

U.S. PATENT DOCUMENTS

| 4,739,419 | 4/1988 | Schauffele | 360/23 |
|---|---|---|---|
| 4,939,593 | 7/1990 | Yuuchi et al. | 360/35.1 |
| 5,027,230 | 6/1991 | Nakayama | 360/35.1 |
| 5,294,997 | 3/1994 | Ogura et al. | 358/342 |

*Primary Examiner*—Tommy P. Chin
*Assistant Examiner*—Khoi Truong
*Attorney, Agent, or Firm*—Robin, Blecker, Daley & Driscoll

[57] ABSTRACT

An image signal recording apparatus of this invention for recording an image signal on a recording medium, is arranged to divide an image signal corresponding to one picture into k field image signals (k=an integer not less than 3), then multiplex a first index signal indicating that frame reproduction is possible during reproduction with $2n$ field image signals (n=an integer not less than 1) from among the k field image signals thus formed, while multiplexing a second index signal indicating that no frame reproduction is possible during reproduction with m field image signals (m=a positive integer) from among the k field image signals; and then record the k field image signals, each of which is multiplexed with the first or second index signal, on k tracks of the recording medium, respectively. With this arrangement, it is possible to record on the recording medium an image signal with high image quality compared to conventional arrangements while retaining compatibility with them.

15 Claims, 4 Drawing Sheets

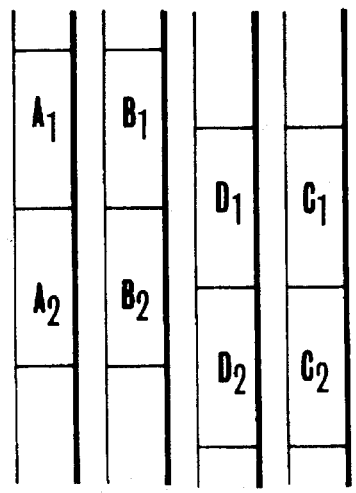
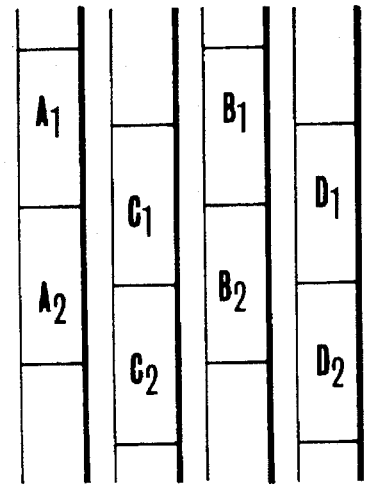
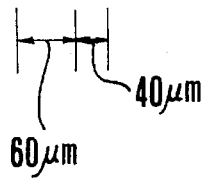
FIG.2(a)
(PRIOR ART)
FIG.2(b)
(PRIOR ART)

FIG.3(a) (PRIOR ART) Y
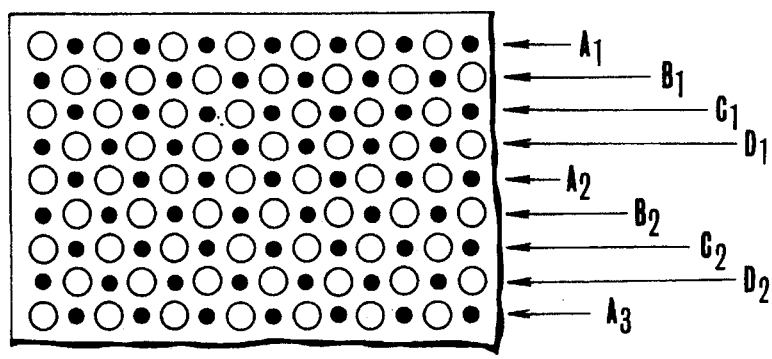
FIG.3(b) (PRIOR ART) $C_R$ (R-Y)
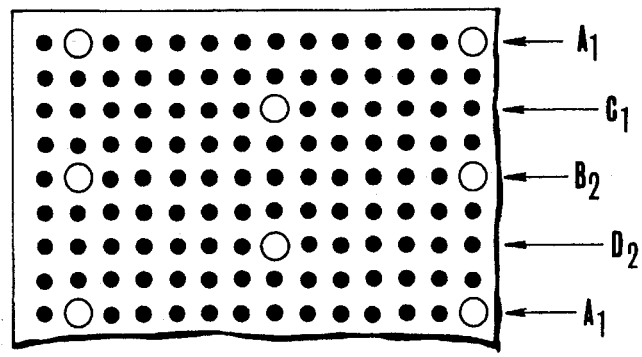
FIG.3(c) (PRIOR ART) $C_B$ (B-Y)
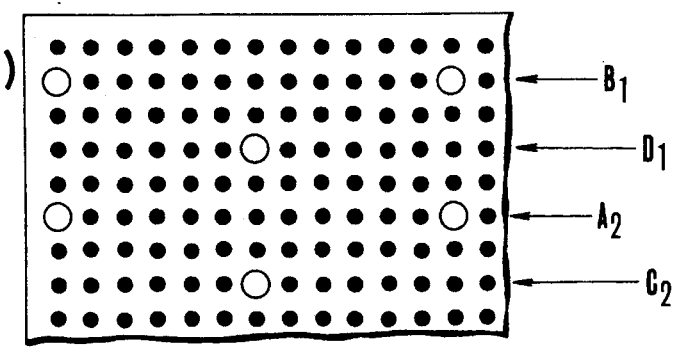

IMAGE SIGNAL RECORDING APPARATUS CAPABLE OF RECORDING FIELD IMAGE SIGNALS, FRAME IMAGE SIGNALS AND HIGH DEFINITION IMAGE SIGNALS

This is a continuation application under 37 CFR 1.62 of prior application Ser. No. 07/507,320, filed Apr. 9, 1990, now abandoned.

BACKGROUND OF THE INVENTION

1. Field of the Invention

The present invention relates to an image signal recording apparatus for recording an image signal on a recording medium.

2. Description of the Related Art

It is known that various television systems such as NTSC systems and PAL systems have conventionally been used in the field of still image signal recording/reproducing systems of the type which are arranged to record a still image signal on a recording medium and to reproduce a still image signal recorded on the recording medium. In general, the still image signal recording/reproducing systems utilize a method including the steps of frequency-modulating image signals of a format according to such a television system and magnetically recording the modulated image signals on small magnetic disks called video floppy disks. The resolution represented by the image signal recorded by the above method is substantially equal to that realized by the current television systems. However, if an image reproduced by such a still image recording/reproducing system is printed out by means of a printer or the like, image quality, particularly resolution, is low as compared to the resolution of a typical silver salt photograph.

In recent years, new television systems, such as a high-definition television (HDTV) system, have been investigated and proposed. The HDTV system realizes the vertical resolution of approximately 1,000 scanning lines per picture and has a signal band which provides horizontal resolution corresponding to the vertical resolution. For this reason, as a still image signal recording/reproducing system corresponding to the HDTV system, it is desired to provide a system capable of recording and reproducing still image signals which assure image quality of the order of 1,000× 1,000 pixels.

In such circumstances, a recording/reproduction method which makes it possible to record still image signals with image quality as high as 1,000×1,000 pixels while retaining compatibility with the recording format used in a conventional type of still image signal recording/reproducing system, has previously been proposed in U.S. patent applications Ser. No. 334,305 filed on Apr. 27, 1989, Ser. No. 344,202 filed on Apr. 27, 1989, Ser. No. 345,411 filed on Apr. 28, 1989, Ser. No. 450,393 filed on Dec. 14, 1989, Ser. No. 457,275 filed on Dec. 27, 1898, Ser. No. 460,308 filed on Jan. 3, 1990 and Ser. No. 460,306 filed on Jan. 3, 1990. The above method and the conventional method will be hereinafter referred to as a "CHSV (Compatible High-Definition Still Video) method" and a "SV method", respectively.

The operation of recording a luminance signal according to the CHSV method will be explained below. FIG. 1 partly shows the sampling positions of each luminance signal Y on a picture, which luminance signals Y are recorded on a video floppy disk by the CHSV method. The luminance signals Y (or Y signals) are sub-sampled and recorded in such a manner that each line of sample points is alternately offset in relation to the next adjacent line of sample points. For reproduction, the alternating sample points are converted into a lattice-like matrix of sample points by means of interpolation. The number of sample points is 600 (=1,200/ 2) per line and 500 (=1,000/2) per column, and information representing all the sample points in one picture is recorded on a total of four tracks. Referring to FIG. 1, for example, information representing the sample points contained in each line $A_1, A_2, \ldots$ is recorded on one particular track of the video floppy disk, information representing the sample points contained in each line $B_1, B_2, \ldots$ is recorded on another track of the video floppy disk, and so on. Recording on each track is performed in accordance with the recording format of the SV method, and the basebands of the Y signal and a chrominance signal C (or C signal) are approximately 7 MHz and approximately 1 MHz, respectively. In the sampling method shown in FIG. 1, the number of Y-signal sample points is, as described above, approximately 600 per line, and these sample points are inserted in the horizontal effective picture period (approximately 53 μs) of an NTSC television signal. Accordingly, the corresponding sampling period is approximately 5.7 MHz.

In the CHSV method, information representing the sample points for one picture is recorded on four tracks, and, when the application of the CHSV method to the camera-integrated type is taken into account, the time required for recording needs to be minimized to prevent image quality from being deteriorated by an increase in dark current in an image sensor. Accordingly, in the CHSV method, information is normally recorded on two or four tracks at the same time.

FIGS. 2(a) and 2(b) show the patterns of track recordings on a video floppy disk according to the CHSV method, respectively. In each of FIGS. 2 (a) and 2(b), the right-hand and left-hand ends correspond to the inner and outer circumferences of the video floppy disk. FIG. 2(a) shows the case of a two-channel head, and FIG. 2(b) shows the case of a four-channel head. Of course, the four-channel head can be used to effect recording in accordance with the recording pattern of FIG. 2(a).

Referring to the case shown in FIG. 2(a), information representing the sample points of the Y signals in lines $A_i$ (i=integer) and lines $B_i$ are initially recorded on first and second tracks at the same time. Then, the head, if of the two-channel type, is shifted to third and fourth tracks, and records information representing the sample points of the Y signals in lines $D_i$ and lines $C_i$ on the respective tracks at the same time. In the case of a four-channel head, the head is not shifted to effect similar recording. To assure compatibility with the SV method, the order of the lines $D_i$ and $C_i$ is reversed as illustrated. As is well known, the above two-track simultaneous recording generally has the problem that crosstalk signals occur between by two heads during recording. However, the above-described recording method can be used to solve such a problem by effecting well-known "horizontal (H) alignment" between the two heads during simultaneous recording.

In the case of the four-channel head shown in FIG. 2(b), information representing the Y-signal sample points in the lines $A_i$ and $B_i$ is recorded on the first and third tracks, respectively, at the same time, and information representing the Y-signal sample points in the lines $C_i$ and $D_i$ is recorded on the second and fourth tracks, respectively, at the same time.

In the track recording pattern shown in FIG. 2(a), the second and third tracks can be used to effect frame-mode reproduction based on the SV method. In the track recording pattern shown in FIG. 2(b), the first and second tracks or the third and fourth tracks can be used to effect frame-mode reproduction based on the SV method.

The operation of recording a chrominance signal C by the CHSV method will now be explained below. FIGS. 3(a), 3(b) and 3(c) show the relation between sample points on a picture. The sample points of FIGS. 3(a), 3(b) and 3(c) are respectively derived from Y signals, $C_R$ (=R−Y) signals and $C_B$ (=B−Y) signals, all of which are recorded on a video floppy disk. Of the sample points, sample points corresponding to recorded information are indicated by "○" and sample points corresponding to information to be interpolated are indicated by "·". In the recording format according to the SV system, a recording band for the C signal is approximately one sixth of that for the Y signal, and the C signal is recorded in a line-sequential manner. Accordingly, the positions of the sample points of the color-difference signals $C_R$ and $C_B$ are as shown in FIGS. 3(b) and 3(c), respectively. Throughout FIGS. 3(a), 3(b) and 3(c) each of which shows the lines $A_i$ and $B_i$ as well as lines $C_i$ and $D_i$, the Y signals, the $C_R$ signals or the $C_B$ signals recorded on the same track of the video floppy disk are indicated by the identical symbol $A_i$, $B_i$, $C_i$ or $D_i$. In FIGS. 3(a), 3(b) and 3(c), although there is a positional discrepancy between the Y-signal lines and the corresponding C-signal lines, this discrepancy is needed to assure compatibility with the SV system (for example, and intra-field color-difference line-sequential operation).

As is apparent from the foregoing, the CHSV method is a recording method based on the assumption of retaining compatibility with the recording format of the SV system. However, in the recording format of the current SV system, an image signal and an ID code are recorded together, and the ID code includes identification information for identifying frame recording or field recording. An important consideration in the CHSV method is, therefore, how to handle such frame recording/field recording identification information.

SUMMARY OF THE INVENTION

It is therefore an object of the present invention to provide an image signal recording apparatus which is capable of solving the above-described problems.

It is another object of the present invention to provide an image signal recording method which is capable of recording an image signal, which corresponds to a high-resolution image compared to conventional systems, on a recording medium while retaining compatibility therewith.

To achieve the above object, according to one aspect of the present invention, there is provided an image signal recording method of recording an image signal on a recording medium, including the steps of: dividing an image signal corresponding to one picture into k field image signals (k=an integer not less than 3); multiplexing a first index signal indicating that frame reproduction is possible during reproduction with 2n field image signals (n=an integer not less than 1) from among the k field image signals formed in the above dividing step, and multiplexing a second index signal indicating that no frame reproduction is possible during reproduction with m field image signals (m=a positive integer) from among the k field image signals; recording the k field image signals, each of which is multiplexed with one of the first and second index signals, on k tracks of the recording medium, respectively.

It is another object of the present invention to provide an image signal recording apparatus which is capable of recording an image signal, which corresponds to a high-resolution image compared to conventional systems, on a recording medium while retaining compatibility therewith.

To achieve the above object, according to one aspect of the present invention, there is provided an image signal recording apparatus for recording an image signal on a recording medium, which apparatus includes: dividing means for dividing an image signal corresponding to one picture into k field image signals (k=an integer not less than 3); index-signal multiplexing means for multiplexing a first index signal indicating that frame reproduction is possible during reproduction with 2n field image signals (n=an integer not less than 1) from among the k field image signals formed by the dividing means, and for multiplexing a second index signal indicating that no frame reproduction is possible during reproduction with m field image signals (m=a positive integer) from among the k field image signals; and recording means for recording the k field image signals, each of which is multiplexed with one of the first and second index signals, on k tracks of the recording medium, respectively.

It is another object of the present invention to provide an image signal recording and reproducing system which is capable of recording and reproducing an image signal, which corresponds to a high-resolution image compared to conventional systems, on a recording medium while retaining compatibility therewith.

To achieve the above object, according to one aspect of the present invention, there is provided an image signal recording and reproducing system for recording an image signal on a recording medium and reproducing the image signal recorded on the recording medium. This system is provided with a recording apparatus and a reproducing apparatus. The recording apparatus includes: dividing means for dividing an image signal corresponding to one picture into k field image signals (k=an integer not less than 3); index-signal multiplexing means for multiplexing a first index signal indicating that frame reproduction is possible during reproduction with 2n field image signals (n=an integer not less than 1) from among the k field image signals formed by said dividing means, and for multiplexing a second index signal indicating that no frame reproduction is possible during reproduction with m field image signals (m=a positive integer) from among the k field image signals; and recording means for recording the k field image signals, each of which is multiplexed with one of the first and second index signals, on k tracks of the recording medium, respectively. A reproducing apparatus includes reproducing means for reproducing the field image signals, each of which is multiplexed with one of the first and second index signals, recorded on the respective k tracks of the recording medium, and reproducing-operation controlling means for controlling the reproducing operation of the reproducing means so that frame reproduction is effected with the field image signal multiplexed with the first index signal from among the field image signals reproduced by the reproducing means.

It is another object of the present invention to provide an image signal recording medium which is capable of recording and reproducing an image signal, which corresponds to a high-resolution image compared to conventional system, on a recording medium while retaining compatibility therewith.

To achieve the above object, in one form of the present invention, there is provided an image signal recording medium for recording thereon an image signal corresponding to k field images (k=an integer not less than 3) which form one picture. This medium includes: a first track for recording thereon a first field image signal corresponding to one field image from among the k field images and a first index signal indicating that frame reproduction is possible during reproduction; and a second track for recording thereon a second field image signal corresponding to a field image different from said one field image corresponding to the field image signal from among the k field images and a second index signal indicating that frame reproduction can be effected during reproduction in cooperation with the field image signal recorded together with the first index signal.

Further objects, features and advantages of the present invention will become apparent from the following detailed description of an embodiment of the present invention with reference to the accompanying drawings.

BRIEF DESCRIPTION OF THE DRAWINGS

FIGS. 2(a) and 2(b) are schematic views showing the pattern of track recordings formed on a video floppy disk according to the CHSV method;

FIGS. 3(a), 3(b) and 3(c) are schematic views showing the relation between sample points on a picture, which sample points are respectively derived from Y signals, $C_R$ (=R−Y) signals and $C_B$ (=B−Y) signals, all of which are recorded on a video floppy disk.

DETAILED DESCRIPTION OF THE PREFERRED EMBODIMENT

A preferred embodiment of the present invention will be described in detail below with reference to the accompanying drawings.

Figure 1:
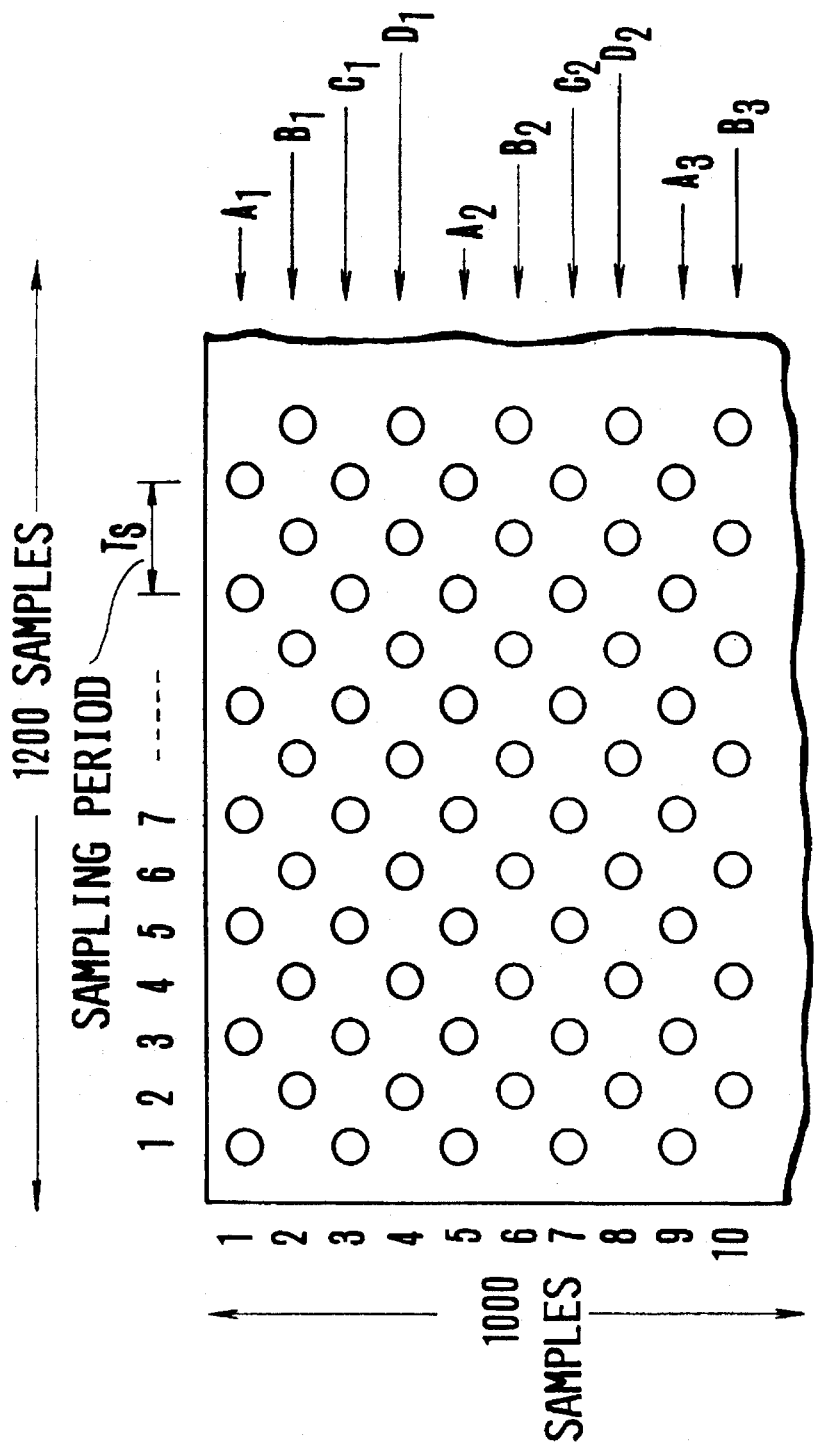
FIG. 1 is a partial schematic view showing the sampling positions of each luminance signal Y on a picture, which luminance signals Y are recorded on a video floppy disk by a CHSV method.
Figure 4:
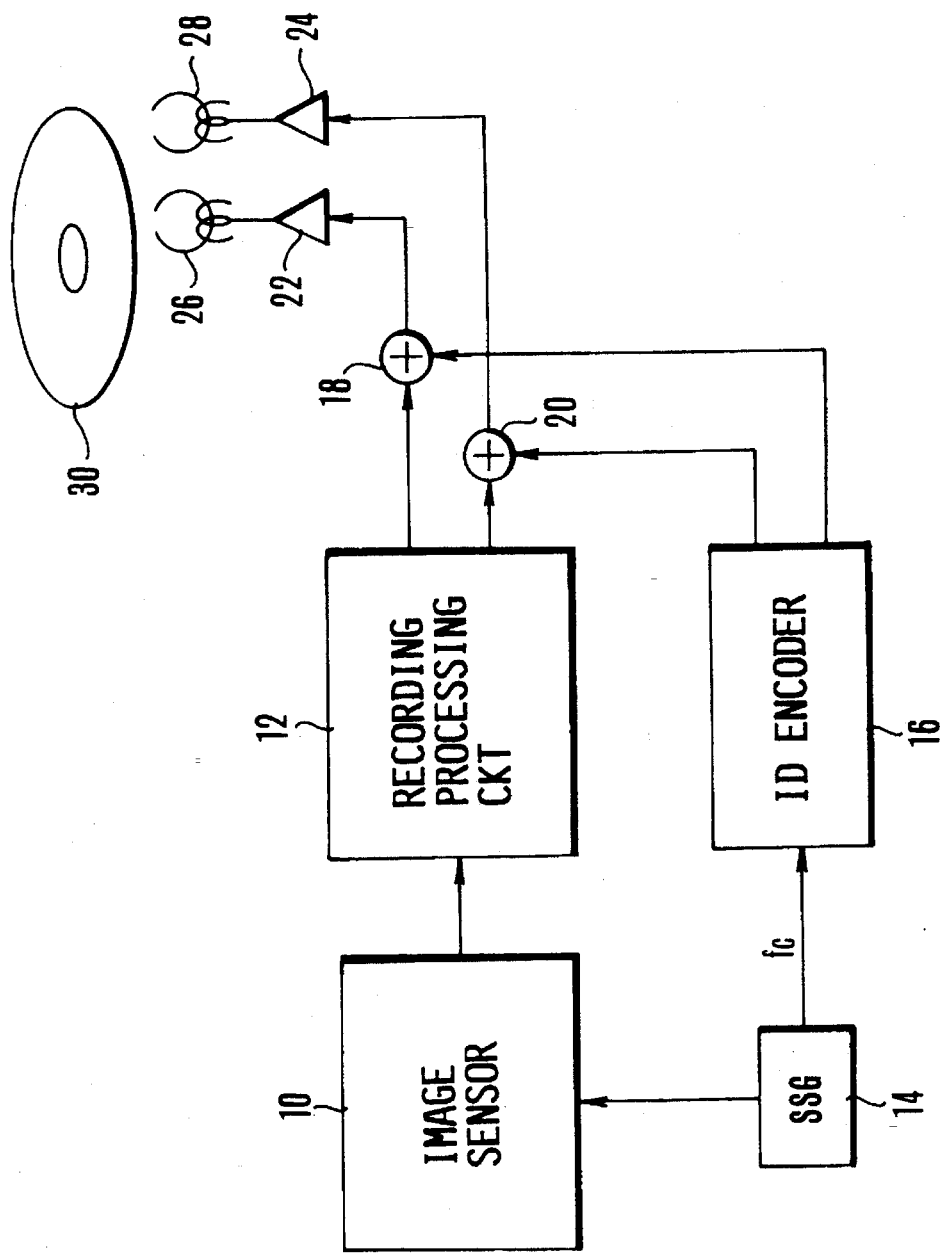
FIG. 4 is a schematic block diagram showing the construction of a two-channel head type of image signal recording apparatus according to one embodiment of the present invention.

FIG. 4 is a schematic block diagram showing the construction of a two-channel head type of image signal recording apparatus according to one embodiment of the present invention. The illustrated an image signal recording apparatus comprises an image sensor 10, a CHSV type recording processing circuit 12, a synchronizing signal generating circuit (SSG) 14, an ID encoder 16, addition circuits 18 and 20, recording amplifiers 22 and 24, recording heads 26 and 28, and a video floppy disk 30 for use as a recording medium.

The recording processing circuit 12 applies predetermined processing such as sub-sampling, emphasis and frequency modulation to the output of the image sensor 10, and sequentially outputs signals to be recorded on first and second tracks and signals to be recorded on third and fourth tracks. The ID encoder 16 outputs an ID code, which will be described below, in accordance with a signal fc supplied from the synchronizing signal generating circuit 14. The addition circuits 18 and 20 effect frequency-multiplexing of the respective outputs of the recording processing circuit 12 and ID codes supplied from the ID encoder 16. The multiplexed signals are supplied to the individual recording heads 26 and 28 through the recording amplifiers 22 and 24, respectively, and are recorded on two tracks of the video floppy disk 30 at the same time.

The following is an explanation of the frame/field identification information contained in the ID codes output from the ID encoder 16.

If image signals are to be recorded in accordance with the recording format shown in FIG. 2(a), the ID encoder 16 outputs ID codes so that frame/field identification information indicating "field" is recorded on the first track, frame/field identification information indicating "frame (outer)" on the second track, frame/field identification information indicating "frame (inner)" on the third track, and frame/field identification information indicating "field" on the fourth track. With this arrangement, even in a conventional SV type of image signal reproducing apparatus, the image signals recorded on the first and fourth tracks can be reproduced in field mode, while the image signals recorded on the second and third tracks can be reproduced in frame mode. If image signals are to be recorded in accordance with the recording format shown in FIG. 2(b), the ID encoder 16 outputs ID codes so that frame/field identification information indicating "frame (outer)" is recorded on the first and third tracks and that indicating "frame (inner)" on the second and fourth tracks. With this arrangement, even in the conventional SV type of image signal reproducing apparatus, the image signals recorded on the first and second tracks and those recorded on the third and fourth tracks can be reproduced in frame mode, respectively.

As will be readily understood from the foregoing, according to the present invention, it is possible to record an image signal, which corresponds to a high-resolution image compared to conventional systems, while retaining compatibility therewith.

What is claimed is:

1. An image signal recording method capable of recording field image signals, frame image signals composed of two field image signals with their corresponding scanning lines being in an interlacing relation to each other on a picture and high-definition image signals composed of four field image signals with their corresponding scanning lines being in an interlacing relation to each other on the picture on a recording medium, respectively, comprising:

(A) a first step of dividing a high-definition image signal corresponding to one picture into four field image signals with their corresponding scanning lines being in an interlacing relation to each other on the picture;

(B) a second step of multiplexing a first index signal indicating that frame reproduction is possible during reproduction with two field image signals from among said four field image signals formed in said first step, and multiplexing a second index signal indicating that frame reproduction is impossible during reproduction with the other two field image signals; and (C) a third step of recording said four field image signals, multiplexed with said first or second index signals, in the second step on four tracks of said recording medium, one field image signal on each track, respectively.

2. An image signal recording method according to claim 1, wherein in said third step, said two field image signals, each of which is multiplexed with said first index signal, are respectively recorded on continuous two tracks from among said four tracks of said recording medium.

3. An image signal recording method according to claim 1, wherein said recording medium is a disk-shaped recording medium, said four tracks being formed concentrically on said disk-shaped recording medium.

4. An image signal recording method according to claim 1, wherein said first index signal includes an odd field index signal and an even field index signal, said odd field index signal being indicative that said multiplexed field image signal corresponds to an odd field image, and said even field index signal being indicative that said multiplexed field image signal corresponds to an even field image.

5. An image signal recording method according to claim 1, wherein, in said second step, said first index signal indicating that frame reproduction is possible during reproduction is frequency-multiplexed with said two field image signals from among said four field image signals formed in said first step, while said second index signal indicating that frame reproduction is impossible during reproduction is frequency-multiplexed with the other two field image signals.

6. An image signal recording apparatus capable of recording field image signals, frame image signals composed of two field image signals with their corresponding scanning lines being in an interlacing relation to each other on a picture, and high-definition image signals composed of four field image signals with their corresponding scanning lines being in an interlacing relation to each other on the picture on a recording medium, respectively, comprising:

(A) dividing means for dividing the high-definition image signals corresponding to one picture into the four field image signals with their corresponding scanning lines being in an interlacing relation to each other on the picture;

(B) multiplexing means for multiplexing a first index signal indicating that frame reproduction is possible during reproduction with two field image signals from among said four field image signals formed by said dividing means, and for multiplexing a second index signal indicating that the reproduction is impossible with the other two field image signals; and (C) recording means for recording said four field image signals, multiplexed with the first or second index signals by the multiplexing means on four tracks of said recording medium, one field image signal on each track, respectively.

7. An image signal recording apparatus according to claim 6, wherein said recording means is arranged to record said respective two field image signals, each of which is multiplexed with said first index signal, on contiguous two tracks from among said four tracks of said recording medium.

8. An image signal recording apparatus according to claim 6, wherein said recording medium includes a disk-shaped recording medium, said four tracks being formed concentrically on said disk-shaped recording medium.

9. An image signal recording apparatus according to claim 6, wherein said first index signal includes an odd field index signal and an even field index signal, said odd field index signal being indicative that said multiplexed field image signal corresponds to an odd field image, and said even field index signal being indicative that said multiplexed field image signal corresponds to an even field image.

10. An image signal recording apparatus according to claim 6, wherein, in said multiplexing means is arranged to frequency-multiplex said first index signal indicating that frame reproduction is possible during reproduction with said two field image signals from among said four field image signals formed by said dividing means, and to frequency-multiplex said second index signal indicating that frame reproduction is impossible during reproduction with the other two field image signals.

11. An image signal recording and reproducing apparatus capable of recording field image signals, frame image signals composed of two field image signals with their corresponding scanning lines being in an interlacing relation to each other on a picture and high-definition image signals composed of four field image signals with their corresponding scanning lines being in an interlacing relation to each other on the picture on a recording medium, respectively, and capable of reproducing the field image signals, the frame image signals and the high-definition image signals recorded on said recording medium, comprising:

(A) a recording device including:
  (a) dividing means for dividing the high-definition image signals corresponding to one picture into the four field image signals with their corresponding scanning lines being in an interlacing relation to each other on the picture;
  (b) multiplexing means for multiplexing a first index signal indicating that frame reproduction is possible during reproduction with two field image signals from among said four field image signals formed by said dividing means, and for multiplexing a second index signal indicating that the reproduction is impossible with the other two field image signals; and
  (c) recording means for recording said four field image signals, multiplexed with the first or second index signals, by the multiplexing means on four tracks of said recording medium, one field image signal on each track, separately; and (B) a reproducing device including:
  (a) reproducing means for reproducing the field image signals, multiplexed with said first or second index signals, and recorded on said four tracks of said recording medium; and
  (b) reproduction controlling means for controlling the reproducing operation of said reproducing means so as to reproduce as a frame image signal the two field image signals multiplexed with said first index signal from among the field image signals reproduced by said reproducing means.

12. An image signal recording and reproducing apparatus according to claim 11, wherein said recording means is arranged to record said respective two field image signals, each of which is multiplexed with said first index signal, on continuous two tracks from among said four tracks of said recording medium.

13. An image signal recording and reproducing apparatus according to claim 11, wherein said recording medium includes a disk-shaped recording medium, said four tracks being formed concentrically on said disk-shaped recording medium.

14. An image signal recording and reproducing apparatus according to claim 11, wherein said first index signal includes an odd field index signal and an even field index signal, said odd field index signal being indicative that said multiplexed field image signal corresponds to an odd field image, and said even field index signal being indicative that said multiplexed field image signal corresponds to an even field image.

15. An image signal recording and reproducing apparatus according to claim 11, wherein said multiplexing means is arranged to frequency-multiplex the first index signal indicating that frame reproduction is possible during reproduction with said two field image signals from among said four field image signals formed by said dividing means, and to frequency-multiplex the second index signal indicating that frame reproduction is impossible during reproduction with the other two field image signals.

* * * * *